March 1, 1955 G. B. WAGNER 2,703,016
HIGH-PRESSURE LOW GRADIENT HYDRAULIC SEAL
Filed Oct. 12, 1953
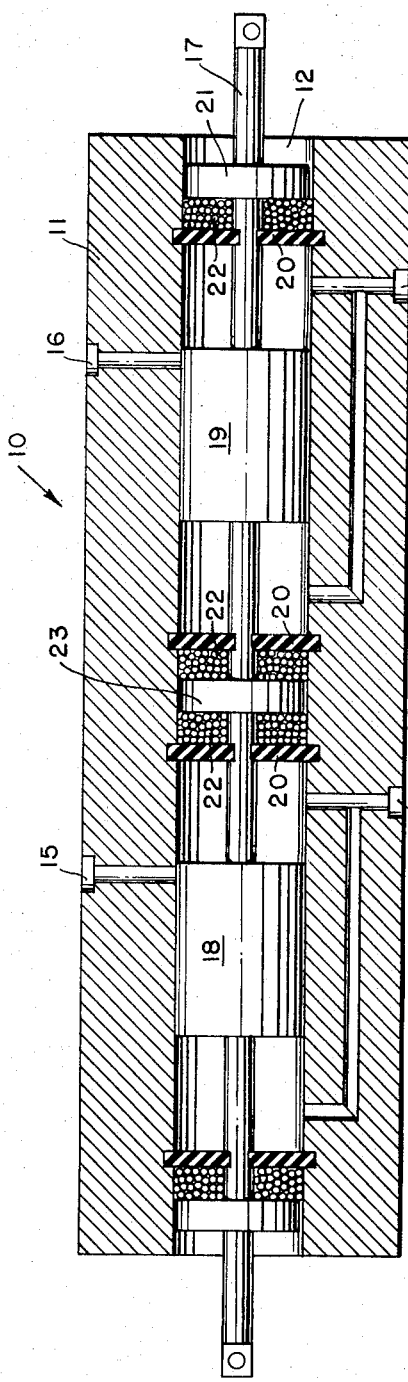
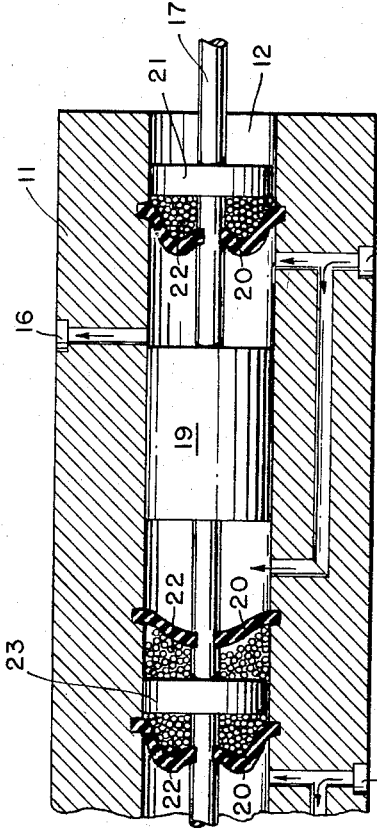
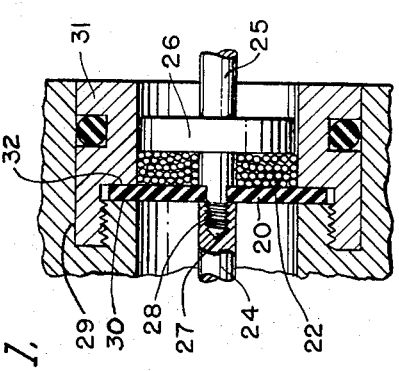
INVENTOR.
GLENN B. WAGNER
BY
ATTORNEYS

United States Patent Office 2,703,016
Patented Mar. 1, 1955

2,703,016

HIGH-PRESSURE LOW GRADIENT HYDRAULIC SEAL

Glenn B. Wagner, Schenectady, N. Y., assignor, by mesne assignments, to the United States of America as represented by the Secretary of the Navy Application October 12, 1953, Serial No. 385,724

6 Claims. (Cl. 74—18.2)

The present invention relates to a fluid seal and more particularly to means for providing a high-pressure, low gradient fluid-tight seal between relatively movable parts.

Heretofore it has been the practice to employ resilient O-rings or bellows arrangements as fluid seals in those constructions wherein it was necessary or desirable to prevent the leakage of pressure fluid between relatively movable members, as for example between the stem of a slidable valve and the valve sleeve. While O-rings have suitable fluid sealing characteristics, their uses as a high pressure fluid seal between relatively movable parts is limited because of their relatively high coefficient of sliding friction. Bellows arrangements function satisfactorily as low pressure seals between relatively movable parts but at high pressures the spring gradient of the bellows becomes excessive and thus their use is likewise limited.

The sealing arrangement of the present invention overcomes the disadvantages associated with the prior art devices by providing a seal of the flexible diaphragm type that will function satisfactorily at high pressures, is compact in size, and offers relatively little resistance to the relative movement of the parts.

Accordingly it is an object of the present invention to provide a high pressure, low gradient fluid seal.

Another object of this invention is to provide a high pressure fluid seal between relatively movable members.

Another object is to provide a high pressure fluid seal between relatively movable members which is compact in size and which offers relatively little resistance to the relative movement of the parts.

A further object of the invention is the provision of a low friction fluid seal between the stem of a slidable piston valve and the valve sleeve.

Another object is to provide a low friction fluid seal between the stem of a slidable piston valve and the valve sleeve to prevent the intermixture of two fluids in a bi-fluid control valve.

Other objects are many of the attendant advantages of the present invention will become apparent as the same becomes better understood from the following detailed description had in connection with the accompanying drawings wherein:

Fig. 1 is a partial longitudinal sectional view of a valve assembly incorporating the sealing arrangement of the present invention;

Fig. 2 is a longitudinal sectional view of a modified valve assembly incorporating two forms of the sealing arrangement of the present invention; and Fig. 2A is a view of the right hand end portion of the valve assembly of Fig. 2 showing the parts in displaced position.

Referring now to the drawings and more particularly to Fig. 2, 10 designates broadly a sleeve type valve assembly incorporating the fluid sealing arrangement of the present invention and including a sleeve 11 having a chamber 12 formed therein for slidably receiving a movable valve member including a stem 17. The valve member includes two lands 18 and 19 which are movable in chamber 12 to provide selective communication between inlet ports 13 and 14 and outlet ports 15 and 16 provided in sleeve 11. One form of the sealing arrangement of the present invention is shown at the right hand end of Fig. 2 and includes a flexible diaphragm 20 sealingly secured at its periphery to the wall of chamber 12, as by being fixed by suitable means in annular grooves in the stem and chamber wall, whereby to provide a fluid tight seal in the chamber. Also fixed on stem 17 and spaced somewhat from flexible diaphragm 20 is a piston or collar 21 having a diameter slightly less than the diameter of chamber 12 whereby the periphery of collar 21 will be spaced somewhat from the wall of chamber 12. Positioned in the space between the flexible diaphragm and the collar is a mass of granular, non-compressible substance 22, which in the present invention is shown as being a number of small ball bearings. The sealing arrangement of the present invention may also be made in the form of a double seal as shown, for example, in the center portion of Fig. 2. Thus a pair of flexible diaphragms 20 are, in the same manner as diaphragm 20 in the single seal just described, sealingly secured to stem 17 and to the wall of chamber 12. Fixed on the stem intermediate diaphragms 20 is the collar 23, similar to collar 21, which has an outer diameter slightly less than the diameter of chamber 12. Disposed between the collar 23 and the diaphragms 20 is the granular, non-compressible substance 22 also shown as ball bearings. This double seal may, for example, be employed in a valve assembly which functions to regulate the flow of two different fluids the intermixture of which would be highly detrimental.

Referring to Fig. 1 there are illustrated modified means for securing the flexible diaphragm to the valve stem and to the wall of the valve chamber. Thus the valve stem may comprise two sections 24 and 25, section 24 having formed therein a threaded recess 27 to receive a threaded projection 28 on shaft section 25, the flexible diaphragm being rigidly clamped between the two sections of the stem. The valve sleeve may be provided with a threaded recess 29, having a shoulder 30, to receive a threaded insert 31, also having a shoulder 32, the flexible diaphragm being clamped between said shoulders upon threading of the insert into the recess.

In operation, any pressure exerted by the fluid on the diaphragm will be supported by the solid piston or collar 21, 23, or 26 through the granular, non-compressible substance. The clearance between the collar and the walls of chamber 12 is made sufficiently large to eliminate friction there-between but should be small enough so as to prevent the leakage of the granular substance past the collar. The use of ball bearings as the non-compressible substance further promotes the ease of valve stem movement by providing a rolling contact between the seal assembly and the wall of the valve chamber. Upon movement of the valve stem to the left in Fig. 2, for example, the collar 21 will move with the shaft and give a rectangular displacement while the diaphragm center will likewise move with the shaft producing a triangular displacement. This latter displacement volume will be smaller than the former whereby the mass of non-compressible particles will be reorientated and will cause the diaphragm to stretch to form to an epicycloidal curve as shown in Fig. 2A. Thus the granular substance flows so as to completely fill the gap between the diaphragm and the collar and thus supports the fluid sealing diaphragm in any position of the valve stem. The spring gradient of the diaphragm may be made relatively small by varying the thickness of the diaphragm, and, inasmuch as the collar is spaced from the wall of chamber 12, the coefficient of friction of the seal assembly is substantially eliminated.

Obviously many modifications and variations of the present invention are possible in light of the above teachings. It is therefore to be understood that within the scope of the appended claims the invention may be practiced otherwise than is specifically described.

What is claimed is:

1. A high pressure fluid seal comprising a body having a chamber therein, a rod movable in said chamber, a flexible diaphragm sealingly secured to said rod and sealingly secured at its periphery to the wall of said chamber, a collar on said rod and spaced from said diaphragm, and a granular, non-compressible substance filling the space between said collar and diaphragm.

2. A high pressure fluid seal comprising a body having a chamber therein, a rod movable in said chamber, a flexible diaphragm sealingly secured to said rod and sealingly secured at its periphery to the wall of said chamber, a collar on said rod and spaced from said diaphragm, a mass of granular, non-compressible substance filling the space between said collar and diaphragm, the diameter of said collar being slightly less than the diameter of said chamber whereby a space is provided between the peripheral surface of said collar and the wall of said chamber which space is substantially less than the average size of the granules comprising said substance.

3. A high pressure fluid seal comprising a body having a chamber formed therein, a rod axially movable in said chamber, an elastic diaphragm sealingly secured at its center to said rod and having its periphery sealingly secured to the wall of said chamber, a collar on said rod and spaced from said diaphragm, a mass of granular, non-compressible substance filling the space between said collar and said diaphragm, said diaphragm being deformed from a generally flat shape when said rod is moved axially to a generally cupped shape, said granular substance being reorientated during said movement to constantly support said diaphragm.

4. A high pressure fluid seal comprising a body having a chamber therein, an elastic diaphragm sealingly secured at its periphery to the wall of said chamber, a rod movable in said chamber and passing through and sealingly secured to said diaphragm, a collar on said rod spaced from the diaphragm and having a diameter slightly less than the diameter of said chamber, and a mass of ball-bearings filling the space between said collar and said diaphragm.

5. A high pressure fluid seal comprising a body having a chamber therein, a rod movable in said chamber, a pair of spaced elastic diaphragms sealingly secured to said rod and having their peripheries sealingly secured to the wall of said chamber, a collar on said rod between and spaced from the diaphragms, and a mass of granular, non-compressible substance filling the spaces between said collar and said diaphragms.

6. In a high pressure fluid seal, a rod member, a flexible diaphragm sealingly secured to said rod member, a collar fixed to said rod member and spaced from said diaphragm, a mass of granular, non-compressible substance filling the space between said collar and diaphragm, the diameter of said diaphragm being somewhat greater than the diameter of said collar.

No references cited.